United States Patent
Salesse et al.

(10) Patent No.: US 6,860,338 B2
(45) Date of Patent: Mar. 1, 2005

(54) DEVICE FOR DISPLACING A LOAD

(76) Inventors: Christian Salesse, 10, rue du Pilat, F-07100 Annonay (FR); Jean-Marc Loriot, 15, rue Lakanal, F-75015 Paris (FR)

( * ) Notice: Subject to any disclaimer, the term of this patent is extended or adjusted under 35 U.S.C. 154(b) by 0 days.

(21) Appl. No.: 10/381,444

(22) PCT Filed: Sep. 20, 2001

(86) PCT No.: PCT/FR01/02930

§ 371 (c)(1),
(2), (4) Date: Jul. 18, 2003

(87) PCT Pub. No.: WO02/25018

PCT Pub. Date: Mar. 28, 2002

(65) Prior Publication Data

US 2004/0011540 A1 Jan. 22, 2004

(30) Foreign Application Priority Data

Sep. 25, 2000 (FR) .......................................... 00 12156

(51) Int. Cl.$^7$ .............................................. E21B 7/00
(52) U.S. Cl. .............................. 173/49; 173/44; 173/56; 173/91
(58) Field of Search .............................. 173/44, 49, 56, 173/91, 131, 162.1, 164; 166/380; 175/55, 85; 414/22.51

(56) References Cited

U.S. PATENT DOCUMENTS

| | | | | |
|---|---|---|---|---|
| 3,280,924 A | * | 10/1966 | Tatarnikov | 175/55 |
| 3,351,372 A | * | 11/1967 | Marks et al. | 294/81.5 |
| 3,828,864 A | * | 8/1974 | Haverkamp et al. | 173/49 |
| 3,964,552 A | * | 6/1976 | Slator | 173/164 |
| 4,050,527 A | * | 9/1977 | Lebelle | 173/49 |
| 4,121,806 A | * | 10/1978 | Iato et al. | 166/355 |
| 4,421,179 A | * | 12/1983 | Boyadjieff | 173/44 |
| 4,800,968 A | * | 1/1989 | Shaw et al. | 175/85 |
| 4,813,498 A | | 3/1989 | Lynch et al. | |
| 4,819,740 A | * | 4/1989 | Warrington | 173/49 |
| 4,901,591 A | | 2/1990 | Oppermann et al. | |

FOREIGN PATENT DOCUMENTS

| | | |
|---|---|---|
| FR | 2 627 718 | 9/1989 |
| WO | WO 99/58810 | 11/1999 |

OTHER PUBLICATIONS

International Search Report of PCT/FR01/02930, dated Dec. 14, 2001.
International Preliminary Examination Report of PCT/FR01/02930, dated Jul. 25, 2002.

* cited by examiner

*Primary Examiner*—Rinaldi I. Rada
*Assistant Examiner*—Nathaniel Chukwurah
(74) *Attorney, Agent, or Firm*—Christie, Parker & Hale, LLP

(57) ABSTRACT

The invention concerns a device for displacing a load (14) comprising a mobile support (12) adapted to support a load and exert on the load a force in a given direction, and device for mechanical balancing (10) interposed between the mobile support (12) and the load (14) so as to compensate the weight of the load and allow movements of slight amplitude of the load in a direction parallel to the load. The device is particularly useful for manoeuvring stakes, such as sheet piles and the like. The balancing device (10) can alternatively be integrated between the mobile support (12) and a vibration generator (46) to isolate the support from the vibrations generated by the vibration generator.

11 Claims, 1 Drawing Sheet

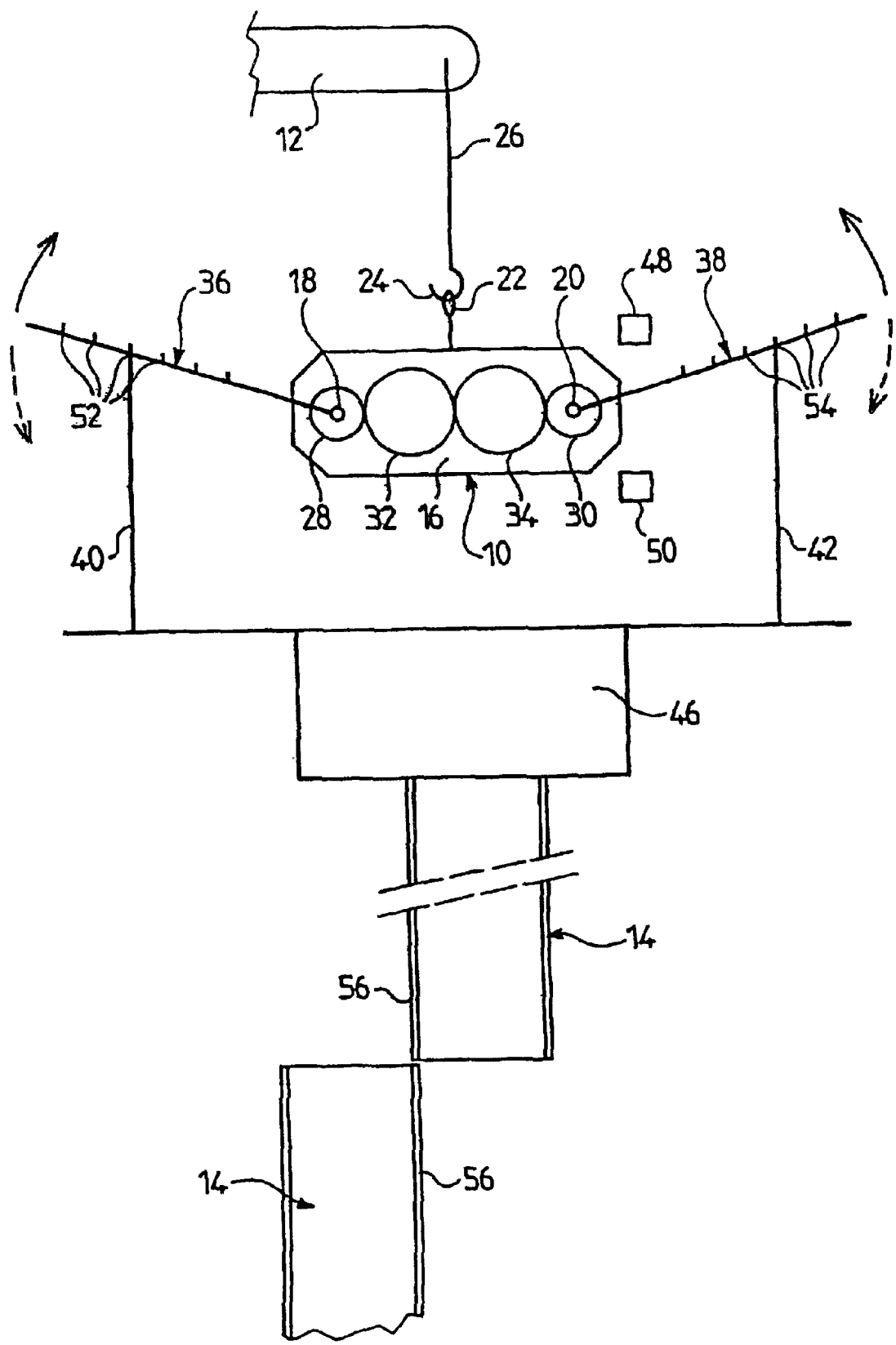

DEVICE FOR DISPLACING A LOAD

CROSS-REFERENCE TO RELATED APPLICATION

This application is a National Phase Patent Application of International Application Number PCT/FR01/02930, filed on Sep. 20, 2001, which claims priority of French Patent Application Number 00/12156, filed Sep. 25, 2000.

The invention relates to a device for displacing a load comprising a mobile support adapted to support the load and exert a force in a given direction on this load.

It relates, more particularly, to a displacement device of this type which is capable of allowing small amplitude movements of the load parallel to the direction of the force, without necessitating significant force and without causing significant reactions on the mobile support.

This mobile support is generally a handling machine such as a crane or the like which is capable of displacing the load in a vertical direction, in the ascending or descending direction.

In a preferred application of the invention, the device is intended to displace a load attached to the mobile support and capable of having small amplitude vertical movements.

A displacement device of this type may have, in particular, two main applications. One of these is the positioning of piles, also known as sheet piles, capable of being sunk in the ground. The other of these applications concerns sinking or extraction of piles in the ground by means of a vibration generator.

In the first application it is necessary to install sheet piles which are long metal parts in the form of profiles of which the weight is generally between some hundreds of kilograms and some tonnes. These parts are sunk in the ground while being connected to one another to prevent water from flowing into a given zone, generally for carrying out work there.

These sheet piles are installed using a handling machine such as a crane which has to displace the sheet pile into a precise position to allow insertion of a notch of the sheet pile in a similar notch in a previously installed sheet pile.

In other words, "precise positioning" of this sheet pile is required so that it may cooperate with a preceding sheet pile.

Up until now there have not been any commercially available means which allow such precise positioning, and no solution has been proposed to solve this problem.

In fact, it is known that current handling apparatus such as lifting cranes and travelling cranes do not allow precise or fine positioning of a load.

In the aforementioned second application, the handling machines are equipped with a vibration generator to sink a pile in the ground by pushing it or, on the contrary, to extract the pile from the ground by pulling it. In all cases, the handling apparatus has to exert a given force on the pile and has to superimpose on this force an alternating force having a frequency of some tens of hertz. This additional alternating force is intended to create vibrations to facilitate the sinking or extraction of the pile.

The main force applied to the pile to sink it or extract it is relatively great (generally approximately some tens of tonnes) whereas the alternating force is lower (generally approximately several of tonnes). This alternating force is generally created by a vibration generating device interposed between the mobile support and the load and comprising moving eccentric masses to create an imbalance.

In the case of pile extraction, the tractive force is exerted by a crane which is capable of pulling the pile with a force of a plurality of tens of tonnes. However, this crane is generally incapable of supporting the vibrations which, for their part, are essential for sinking or extracting the pile.

This problem is currently solved by using vibration damping means generally consisting of springs which may be made of metal, rubber, polyurethane-type plastics material, etc. These means have the particular drawback of exerting a restoring force which is proportional to the displacement and therefore not constant, and this makes the filtering of vibrations imperfect.

Moreover, U.S. Pat. No. 4,813,498 discloses an active counter-balance intended for an injection head for the drilling of wells which employs a hydraulic motor.

In addition, the document WO 99 58810 discloses an apparatus intended to facilitate the connection or disconnection of a drilling rod to a rod train, which comprises a weight-compensating device of the hydraulic or pneumatic type.

The object of the invention is, in particular, to overcome the aforementioned drawbacks.

It aims, in particular, to provide a device for displacing a load of the aforementioned type which is capable of performing small amplitude movements of the load, parallel to the direction of the force, without necessitating significant forces and without causing significant reactions on the mobile support.

The invention aims, in particular, to provide a device of this type which may be used with a handling machine such as a crane for the positioning of piles, in particular sheet piles.

It also aims to produce a handling apparatus of this type which may be used for the sinking or extraction of piles using vibrating means, while filtering these vibrations.

The invention accordingly proposes a device for displacing a load of the type defined at the outset which comprises mechanical balancing means interposed between the mobile support and the load so as to compensate the weight of the load and allow movements of slight amplitude of the load in a direction parallel to the load.

"Mechanical balancing means" denotes balancing means of the autonomous type which generate their own intrinsic law and do not contain any fluid. Therefore, these mechanical means are clearly distinguished from the means described in the aforementioned documents which make use of a fluid and have all the drawbacks inherent in the use of a fluid.

It should also be noted that the mechanical balancing means of the invention do not require guide means as the guidance is imaginary.

Balancing means of this type allow the precise positioning of the load, when positioning piles such as sheet piles, as well as filtering of the vibrations when sinking or extracting piles from the ground.

Thus, the mobile support may be a handling machine capable of displacing the load in the vertical direction so that the balancing means allow precise displacement of the load in the vertical direction.

The mobile support may also be a handling machine capable of displacing the load in the vertical direction and comprising vibration-generating means which support the load and in which the balancing means are interposed between the mobile support and the vibration generating means so as to isolate the mobile support from the vibrations generated by the vibration generating means.

In a preferred embodiment of the invention, these balancing means comprise a balancer capable of providing a sinusoidal mechanical torque and having two output shafts which are parallel and have speeds of rotation which are synchronised but in opposite directions, and in that these two output shafts are disposed in the same horizontal plane and are rotationally engaged with two arms capable of supporting the load via connecting means.

A balancer of this type may be in particular of the type described in French Patent No. 88 02 423, published under No. 2 627 718.

This balancer, which is purely mechanical, is generally used to balance the forces acting on an arm stressed by a load, such as a tool. It allows strict balancing of the arm, whatever its angular position relative to the body to which it is articulated. This arm can normally pivot through 360° relative to the body, and this allows the load to describe a circular trajectory.

In a known balancer of this type, the operator is able to displace the load, such as a tool, virtually without effort since the balancer compensates the forces acting on the arm, whatever the angular position thereof about its hinge pin, which is generally horizontal.

According to the invention, this balancer comprises two synchronised arms rotating in opposite directions and serving to support the load.

The balancer allows either precise positioning of a load or filtering of vibrations if this load is supported by vibration generating means.

Advantageously, the two arms are symmetrical about a vertical plane.

According to a further characteristic of the invention, stops are provided to limit the angular travel of the two arms between a high position and a low position on either side of a horizontal position, and in that locking means are provided to lock the arms in the high position.

In an embodiment, each of the arms comprises a plurality of fixing points capable of supporting a connecting means and in that these fixing points are located at different distances from the output shaft so as to control loads of different values with the same torque adjusting value.

In a variation, each of the arms comprises a fixing point capable of supporting a connecting means and adjusting means capable of varying the distance between the fixing point and the output shaft so as to control loads of different values with the same torque adjusting value.

According to a further characteristic of the invention, the device comprises control means capable of controlling the amplitude of vibration of the arms.

It is also advantageous to provide regulating means capable of controlling possible drifts which may result from an obvious difference, between the mean force and the adjustment of the balancing means.

By way of example, these regulating means comprise either the addition of a value of the carrying force or the adjustment of the number of springs provided in the balancing means.

An additional mass capable of being applied to the frame of the balancing means in order to improve filtering of the vibrations may also be provided.

In the following description, given merely as an example, reference will be made to the accompanying drawings in which the single FIGURE is a diagram of a device for displacing a load according to the invention.

The device shown in the FIGURE of the drawings comprises a balancer 10 interposed between a mobile support 12 (shown schematically) and a pile 14, of the sheet pile type in the example, capable of being sunk in the ground. The mobile support in this case is a handling apparatus of the crane type or the like capable of displacing a load, in this case a pile, in an ascending or descending vertical direction.

The balancer 18 is produced in this embodiment in accordance with the teachings of the aforementioned French Patent No. 88 02 423. It comprises a frame 16 accommodating an internal mechanism capable of providing a sinusoidal mechanical torque and having two output shafts or pins 18 and 20 which are parallel to one another and in the same horizontal plane.

The frame 16 in this case is equipped with a ring 22 capable of cooperating with a hook 24 placed at the end of a hoisting cable 26 of the crane. The balancer 10 is thus suspended from the crane and disposed in such a way that its two output shafts 18 and 20 are in the same substantially horizontal plane.

The output shafts 18 and 20 are integral with two toothed pinions 28 and 30 which mesh respectively with two other toothed pinions 32 and 34 which mesh with one another and are integral with an internal mechanism equipped with springs. As a result, the output shafts 18 and 20 have speeds of rotation which are synchronised but in opposite directions.

These two output shafts 18 and 20 are rotationally engaged with two arms 36 and 38 capable of supporting the load (the pile 14 in this embodiment) via connecting means, two slings 40 and 42 in this embodiment. These slings are connected to fixing means 46 such as forks, which are used to attach the pile 14.

It can be seen that the two arms 36 and 38 are symmetrical about a vertical plane and at least two stops 48 and 50 are provided to limit the angular travel of the two arms between a high position and a low position (not shown) on either side of a horizontal position.

Locking means (not shown) are provided to lock the arms 36 and 38 in the high position. These means may be of any type, in particular mechanical. They may be actuated directly on the balancer, or remotely.

Each of the arms 36 and 38 comprises a plurality of fixing points 52 or 54 respectively, capable of supporting the corresponding sling 40 or 42 respectively. These fixing points are located at different distances from the output shaft to allow control of loads of different values with the same torque adjusting value.

In a variation, each of the arms may comprise a fixing point associated with adjusting means for varying the distance between the fixing point and the corresponding output shaft.

The balancer 10 allows manual displacement of the load by an operator in both the ascending direction and the descending direction without intervention of the crane and over a small course defined appropriately as a function of the assembly to be produced. The suspension system (the cable 26 of the crane in this case) performs a horizontal displacement to allow fitting.

During the handling of the crane, the two arms 36 and 38 synchronised by the balancer are locked in the high position of the travel. As an example, this travel may be of the order of 30° on either side of the horizontal, while being included between a high position and a low position. The low position corresponds approximately to the desired final position.

This assembly typically operates in three phases.

During a first phase, the crane displaces the load 14, a sheet pile in this case, until it comes into the region of the position where this sheet pile is to be connected to a preceding sheet pile (not shown). During this first phase, the two arms of the balancer are preferably locked in the high position. During a second phase, the operator unlocks the arms of the balancer and manually displaces the sheet pile so as to place the notch 56 which it comprises in the notch 56 of a preceding sheet pile. During a third phase, the crane lowers the sheet pile until it is held by the ground, its notch sliding along the notch in the preceding sheet pile. Once the sheet pile is held by the ground, the crane descends some more centimetres, causing the arms of the balancer to stop in the high position and causing the slings 40 and 42 to relax. The operator then locks the arms in the high position and detaches the slings.

The crane is ready for a further manoeuvre. It should be noted that the phase which involves sinking the sheet pile in the ground is not affected by this application of the invention.

The points for fixing or anchoring the slings on each of the arms allow a plurality of weight values of the sheet pile to be adapted for adjusting a single value of the balancer torque. In a variation, a continuous adjusting means may be used, the continuous adjusting means, for example, comprising an endless screw, being manual or motorised, controlled or automatic for displacing the points for fixing the load on the arms and allowing the device to be adapted to a plurality of weight values.

In the assembly described hereinbefore, the slings 40 and 42 do not remain perfectly vertical during operation. If necessary, a stabilising system may be used to stabilise them in space.

In a variation (not shown), the balancer 10 could be supported rather than being suspended.

It should be noted that the arms may each be lengthened beyond the corresponding output shaft and that cables or the like may be connected to the ends of each arm to facilitate the pivoting thereof by an operator.

The device shown in the FIGURE may be used whenever a precise, often manual, final approach is of interest for producing precise positioning, whether this final approach is ascending or descending.

Apart from the installation of piles or the like, in particular sheet piles, other applications may be mentioned. The laying of railway rails, the placement of an engine in a vehicle, the placement of a machine on a base, the attachment of external loads to aircraft and, generally, the handling of heavy loads may be mentioned as non-limiting examples.

In a further embodiment, the mobile support 12 is a handling machine capable of displacing the load in the vertical direction and comprising vibration generating means 46 which support the load 14. The balancing means 10 are interposed between the mobile support and the vibration generating means to isolate the mobile support from the vibrations created by the vibration generating means.

Therefore, the main difference from the preceding embodiment resides in the fact that the load 14, a pile here, is supported by means 46 capable of creating vibrations.

These vibration generating means are used to sink piles into the ground or to remove them from the ground.

The handling machine allows a given force to be exerted in the vertical direction in order to push or extract the pile and to superimpose on this force an alternating force generally having a frequency of some tens of hertz, which is produced by vibration generating means.

In this case, the means 46 are a weight system which vibrates at frequencies of between some tens of hertz and some hundreds of hertz, and the balancer 10 is calibrated differently from the preceding embodiment. The balancer 10 and the fixing points 52 and 54 are adjusted so as to exert the desired force.

When the vibration generating means 46 vibrate, the arms 36 and 38 oscillate and the balancer 10 filters the vibration so that the balancer transmits to the mobile support 12 only the main force "cleaned" of vibrations. Only the high frequencies, higher than the bandwidth of the balancer 10 which do not harm the crane are not filtered. This filtering is effective for fixed, variable or adjustable frequencies of vibration, depending on the nature of the ground.

In other words, whereas the balancer 10 was used to form a precise movement in the preceding embodiment, it is used here to isolate the vibrations from the carrying force.

Advantageously, the main force may be adjusted by displacing the points for fixing on the arms or by displacing an advance weight along the arms or by acting on the number of internal springs in the balancer 10.

The stops 48 and 50 may be replaced by means which provide a force proportional to the sinking, of the spring type, optionally placed at a greater distance from the shafts 18 and 20 so as to be more gradual.

Similarly, a detection system could be incorporated to detect the points of maximum deflection of the arms of the balancer and actuate a device for reversing a drift from the mean position of the arms. This action could be, but is not limited to, a modification of the force exerted by the support or the putting into service or out of service of a portion of the balancer springs.

Finally, a safety device could be added to prevent the vibrations, in the absence of piles, from creating amplitudes which would be harmful to the overall mechanics.

In certain cases, an additional mass may be added to the frame of the balancer to serve as an additional barrier to vibrations.

In this application to vibration generators of the vibrating pile-driver type, the device of the invention allows the vibrations as well as some of their harmonics to be filtered over the entire amplitude of these vibrations. This filtering is effective because, as the balancer generates a sinusoidal torque, the force on the support is constant whatever the position of the arm in so far as the bandwidth of the balancer is compatible with the frequency of the vibrations.

This application is obviously not limited to vibration generators and may also be used to filter undesirable vibrations, for example those of an engine on a fragile base or a base necessitating absolute immobility.

What is claimed is:

1. Device for displacing a load comprising a mobile support adapted to support the load and exert a force in a given direction on the load, characterised in that the device comprises mechanical balancing means interposed between the mobile support and the load so as to compensate a weight of the load and allow movements of an amplitude of the load in a direction parallel to the load and characterised in that the balancing means comprises a balancer capable of providing a sinusoidal mechanical torque and having two output shafts which are parallel and have speeds of rotation which are synchronised but in opposite directions, and in that these two output shafts are disposed in the same horizontal plane and are rotationally engaged with two arms capable of supporting the load via connecting means.

2. Device according to claim 1, characterised in that the mobile support is a handling machine capable of displacing the load in a vertical direction so that the balancing means allow precise displacement of the load in the vertical direction.

3. Device according to claim 1, characterised in that the mobile support is a handling machine capable of displacing the load in a vertical direction and comprising vibration-generating means which support the load and in that the balancing means are interposed between the mobile support and the vibration generating means so as to isolate the mobile support from vibrations generated by the vibration generating means.

4. Device according to claim 1, characterised in that the two arms are symmetrical about a vertical plane.

5. Device according to claim 1, characterised in that stops are provided to limit an angular travel of the two arms between a high position and a low position on either side of a horizontal position, and in that locking means are provided to lock the arms in the high position.

6. Device according to claim 1, characterised in that each of the arms comprises a plurality of fixing points capable of supporting a connecting means and in that these fixing points are located at different distances from at least one of the output shafts so as to control loads of different values with the same torque adjusting value.

7. Device according to claim 1, characterised in that each of the arms comprises a fixing point capable of supporting a connecting means and adjusting means capable of varying a distance between the fixing point and at least one of the output shafts so as to control loads of different values with the same torque adjusting value.

8. Device for displacing a load comprising a mobile support adapted to support the load and exert a force in a given direction on the load, comprising mechanical balancing means interposed between the mobile support and the load so as to compensate a weight of the load and allow movement of an amplitude of the load in a direction parallel to the load;

the mobile support comprising a handling machine capable of displacing the load in a vertical direction and comprising vibration-generating means which supports the load;

the balancing means being interposed between the mobile support and the vibration generating means so as to isolate the mobile support from the vibrations generated by the vibration generating means;

the balancing means comprising a balancer capable of providing a sinusoidal mechanical torque and having two output shafts which are parallel and have speeds of rotation which are synchronised but in opposite directions, the two output shafts being disposed in the same horizontal plane and rotationally engaged with two arms capable of supporting the load through connecting means; and control means capable of controlling the amplitude of the vibrations of the arms.

9. Device according claim 1, wherein a regulating means is capable of controlling possible drift which result from a difference, between a mean force and an adjustment of the balancing means regulating means capable of controlling possible drifts which may result from a difference between a mean force and an adjustment of the balancing means (10).

10. Device according to claim 9, characterised in that the regulating means comprises either an addition of a value of a carrying force or an adjustment of a number of springs provided in the balancing means.

11. Device for displacing a load comprising a mobile support adapted to support the load and exert a force in a given direction on the load, comprising mechanical balancing means interposed between the mobile support and the load so as to compensate a weight of the load and allow movement of an amplitude of the load in a direction parallel to the load;

the balancing means comprising a balancer capable of providing a sinusoidal mechanical torque and having two output shafts which are parallel and have speeds of rotation which are synchronised but in opposite directions, the two output shafts being disposed in the same horizontal plane and rotationally engaged with two arms capable of supporting the load through connecting means; and an additional mass applied to a frame of the balancing means in order to improve filtering vibrations.

* * * * *